US012583308B2

(12) United States Patent
Lian et al.

(10) Patent No.: US 12,583,308 B2
(45) Date of Patent: Mar. 24, 2026

(54) HYBRID POWERTRAIN AND VEHICLE

(71) Applicant: BYD COMPANY LIMITED, Shenzhen (CN)

(72) Inventors: Yubo Lian, Shenzhen (CN); Yinsheng Liao, Shenzhen (CN); Feng Zhang, Shenzhen (CN); Gaoming Zhao, Shenzhen (CN); Qiang Wang, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 0 days.

(21) Appl. No.: 18/606,233

(22) Filed: Mar. 15, 2024

(65) Prior Publication Data

US 2024/0217330 A1      Jul. 4, 2024

Related U.S. Application Data

(63) Continuation of application No. PCT/CN2022/135495, filed on Nov. 30, 2022.

(30) Foreign Application Priority Data

Nov. 30, 2021   (CN) ......................... 202122971218.X
May 31, 2022   (CN) .......................... 202210613740.7

(51) Int. Cl.
*B60K 6/387* (2007.10)
*B60K 6/36* (2007.10)
*B60K 6/48* (2007.10)

(52) U.S. Cl.
CPC ................ *B60K 6/387* (2013.01); *B60K 6/36* (2013.01); *B60K 6/48* (2013.01)

(58) Field of Classification Search
CPC ............ B60K 6/387; B60K 6/48; B60K 6/36
See application file for complete search history.

(56) References Cited

U.S. PATENT DOCUMENTS 4,411,171 A  *  10/1983  Fiala ........................ B60K 6/30
                                                                903/910
10,836,375 B2    11/2020  Kaufman et al.
2007/0175723 A1   8/2007  Blessing et al.
2013/0090208 A1   4/2013  Ichikawa et al.
2013/0153356 A1   6/2013  Fleischmann et al.
(Continued)

FOREIGN PATENT DOCUMENTS

CN        101607523  A      12/2009
CN        102039808  A      5/2011
(Continued)

OTHER PUBLICATIONS

International Search Report and Written Opinion for Application No. PCT/CN2022/135495, mailed on Apr. 20, 2023, 12 pages.
(Continued)

*Primary Examiner* — Jake Cook
(74) *Attorney, Agent, or Firm* — Sheppard Mullin Richter & Hampton LLP

(57)        ABSTRACT

A hybrid powertrain includes a conversion device, a first motor, and an engine. At least one of the first motor and the engine is configured to output power to a driving end through the conversion device. The engine is configured to output power to the first motor through the conversion device, to drive the first motor to generate electricity.

18 Claims, 4 Drawing Sheets

(56) References Cited

U.S. PATENT DOCUMENTS

| | | | |
|---|---|---|---|
| 2021/0016647 | A1 | 1/2021 | Houser et al. |
| 2021/0107347 | A1 | 4/2021 | Yano et al. |
| 2021/0162854 | A1 | 6/2021 | Lehmann et al. |
| 2021/0178889 | A1 | 6/2021 | Singh et al. |
| 2023/0398832 | A1 | 12/2023 | Liu et al. |

FOREIGN PATENT DOCUMENTS

| | | | |
|---|---|---|---|
| CN | 102381177 | A | 3/2012 |
| CN | 104786820 | A | 7/2015 |
| CN | 107160995 | A | 9/2017 |
| CN | 207842651 | A | 9/2018 |
| CN | 208896853 | U | 5/2019 |
| CN | 110667368 | A | 1/2020 |
| CN | 110892167 | A | 3/2020 |
| CN | 111016619 | A | 4/2020 |
| CN | 111055672 | A | 4/2020 |
| CN | 111114275 | A | 5/2020 |
| CN | 111347869 | A | 6/2020 |
| CN | 112319204 | A | 2/2021 |
| CN | 108544916 | B | 7/2021 |
| CN | 215596239 | U | 1/2022 |
| CN | 216709004 | U | 6/2022 |
| CN | 217381366 | U | 9/2022 |
| CN | 217994129 | U | 12/2022 |
| CN | 218228631 | U | 1/2023 |
| EP | 4534311 | A1 | 4/2025 |
| JP | 2003-220841 | A | 8/2003 |
| JP | 5318185 | B2 | 10/2013 |
| JP | 2018-185028 | A | 11/2018 |
| JP | 2020-029938 | A | 2/2020 |
| JP | 2020-039234 | A | 3/2020 |
| JP | 2020-165474 | A | 10/2020 |
| KR | 101786338 | B1 | 10/2017 |
| KR | 20180095234 | A | 8/2018 |
| WO | 2018/078921 | A1 | 5/2018 |

OTHER PUBLICATIONS

Extended European Search Report dated Jan. 14, 2025, issued in European Patent Application No. 22900537.6 (6 pages).

Extended European Search Report dated May 22, 2025, issued in European Patent Application No. 23815240.9 (7 pages).

Extended European Search Report dated Jul. 23, 2025, issued in European Patent Application No. 23815239.1 (8 pages).

Non-Final Office Action dated Mar. 13, 2025, issued in U.S. Appl. No. 18/939,164 (15 pages).

Final Office Action dated Jul. 1, 2025, issued in U.S. Appl. No. 18/939,164 (15 pages).

Notice of Reasons for Refusal dated Jul. 15, 2025, issued in Japanese Patent Application No. 2024-512972, with English machine translation (13 pages).

* cited by examiner

HYBRID POWERTRAIN AND VEHICLE

CROSS-REFERENCE TO RELATED APPLICATIONS

The application is a continuation application of International Patent Application No. PCT/CN2022/135495 filed on Nov. 30, 2022, which is based on and claims priority to and benefits of Chinese patent application No. 202122971218.X filed on Nov. 30, 2021, and 202210613740.7 filed on May 31, 2022. The entire content of all of the above-referenced applications is incorporated herein by reference.

FIELD

The present disclosure relates to the field of vehicles, and in particular, to a hybrid powertrain and a vehicle.

BACKGROUND

In related technologies, the hybrid powertrain of related vehicles has a complex structure, is inconvenient to be arranged and installed on the vehicles, and occupies a large space.

SUMMARY

The present disclosure is to resolve at least one of the technical problems existing in related arts. Therefore, the present disclosure provides a hybrid powertrain, and the hybrid powertrain has a simple and compact structure, so that a vehicle can switch between different driving modes, and driving performance of the vehicle is improved.

The present disclosure provides a vehicle.

In a first aspect, the hybrid powertrain according to the present disclosure includes: a conversion device, a first motor, and an engine. At least one of the first motor and the engine is configured to output power to a driving end through the conversion device. The engine is configured to output power to the first motor through the conversion device, to drive the first motor to generate electricity.

According to the hybrid powertrain of the present disclosure, through the cooperation of the conversion device, the first motor, and the engine, the first motor and the engine jointly output the power to a driving end through the same conversion device. This can simplify a hybrid powertrain structure, so that the hybrid powertrain is compact and an occupied volume is reduced. In addition, the vehicle can be switched to different driving modes through the switching operation of the first motor and the engine. This improves driving performance of the vehicle.

In some embodiments of the present disclosure, the conversion device includes: a first clutch assembly, a second clutch assembly, and a transmission piece. The first motor is configured to output power to the transmission piece. The first clutch assembly is connected between an engine output shaft and the transmission piece to enable the engine to selectively output power to the first motor. The second clutch assembly is connected between the transmission piece and a front differential of front axle wheels, to selectively connect the transmission piece and the front wheels.

In some embodiments of the present disclosure, the first clutch assembly includes a first engagement portion and a second engagement portion, the first engagement portion is fastened to the transmission piece, the second engagement portion is configured to be engaged with the first engagement portion, and the second engagement portion is connected to the engine output shaft.

In some embodiments of the present disclosure, the second clutch assembly includes a third engagement portion and a fourth engagement portion, the third engagement portion is fastened to the transmission piece, the fourth engagement portion is configured to be engaged with the third engagement portion, and the fourth engagement portion is connected to the front differential.

In some embodiments of the present disclosure, the first engagement portion is located on a side of the transmission piece close to the engine, and the third engagement portion is located on a side of the transmission piece away from the engine.

In some embodiments of the present disclosure, the first engagement portion, the third engagement portion, and the transmission piece are integrally formed.

In some embodiments of the present disclosure, the transmission piece includes a gear, the first motor includes a first motor gear disposed on a first motor output shaft, the first motor gear and the transmission piece form a gear pair, and the first motor and the engine are connected by the gear pair.

In some embodiments of the present disclosure, the first engagement portion is connected to the third engagement portion to form a clutch body, and the transmission piece is disposed on the clutch body.

In some embodiments of the present disclosure, the first engagement portion and the third engagement portion are integrally formed.

In some embodiments of the present disclosure, the hybrid powertrain further includes a support shaft, the transmission piece is connected to the support shaft and disposed coaxially with the support shaft, and the second engagement portion and the fourth engagement portion are rotatably sleeved on the support shaft.

In some embodiments of the present disclosure, the second engagement portion includes a chamber, and a first end of the support shaft is located in the chamber and rotatably connected to the second engagement portion.

In some embodiments of the present disclosure, the chamber includes a first limiting portion, a second limiting portion is disposed at the first end of the support shaft, and the first limiting portion and the second limiting portion limit axial movement of the support shaft.

In some embodiments of the present disclosure, the first limiting portion is a spherical groove, a center of the spherical protrusion is aligned with a center of the spherical groove, and an inner wall of the spherical groove is spaced apart from the spherical protrusion.

In some embodiments of the present disclosure, the hybrid powertrain further includes a first bearing, and the second engagement portion is rotatably connected to the support shaft through the first bearing.

In some embodiments of the present disclosure, the hybrid powertrain further includes a housing, and the second engagement portion is rotatably connected to the housing.

In some embodiments of the present disclosure, the second engagement portion and the housing are connected at a first connecting position, the second engagement portion and the support shaft are connected at a second connecting position, and in a radial direction of the support shaft, an orthographic projection of the first connecting position at least partially overlaps with an orthographic projection of the second connecting position.

In some embodiments of the present disclosure, the hybrid powertrain further includes the first bearing and a second bearing, the first bearing is disposed between the second engagement portion and the support shaft, the second bearing is sleeved on the second engagement portion, and in the radial direction of the support shaft, an orthographic projection of the second bearing at least partially overlaps an orthographic projection of the first bearing have an overlapping area.

In some embodiments of the present disclosure, the hybrid powertrain further includes a third bearing, and the fourth engagement portion is rotatably connected to the support shaft through the third bearing.

In some embodiments of the present disclosure, the hybrid powertrain further includes a housing, and a second end of the support shaft is rotatably connected to the housing.

In some embodiments of the present disclosure, the hybrid powertrain further includes a fourth bearing, and the second end of the support shaft is rotatably connected to the housing through the fourth bearing.

In some embodiments of the present disclosure, the first motor output shaft of the first motor is meshed and in transmission with the transmission piece.

In some embodiments of the present disclosure, the first motor output shaft is parallel to the output shaft of the engine.

In some embodiments of the present disclosure, the hybrid powertrain further includes: a second motor, and a transmission. The transmission is connected between the second motor and a rear differential of rear axle wheels, and the second motor outputs power to the rear wheels through the transmission.

In some embodiments of the present disclosure, the hybrid powertrain further includes: an output shaft, and the conversion device includes a first clutch plate, a second clutch plate and a clutch housing.

The engine is in transmission connection with the first clutch plate through an engine output shaft, the first motor is in transmission connection with the clutch housing through a first motor output shaft, and the output shaft is in transmission connection with the second clutch plate; and the clutch housing is engaged with the first clutch plate to enable the hybrid powertrain to be in a power generation mode or a starting mode; or the clutch housing is engaged with the second clutch plate to enable the hybrid powertrain to be in a electric drive mode or a braking feedback mode; or the clutch housing is engaged with the first clutch plate and the second clutch plate to enable the hybrid powertrain to be in one of a hybrid drive mode, a drive-while-generating mode, or an engine direct drive mode.

In some embodiments of the present disclosure, the clutch housing includes a first opening and a second opening, the engine output shaft passes through the first opening and is connected to the first clutch plate, and the output shaft passes through the second opening and is connected to the second clutch plate.

The first clutch plate is correspondingly arranged with the first opening, and the second clutch plate is correspondingly arranged with the second opening.

In some embodiments of the present disclosure, the first opening and the second opening are disposed in an axial direction of the clutch housing, the first opening is disposed on a first end face of the clutch housing, and the second opening is disposed on a second end face of the clutch housing.

In some embodiments of the present disclosure, the hybrid powertrain further includes a third gear, the third gear and the clutch housing are fastened, and the first motor output shaft is connected to the third gear through a fourth gear.

In some embodiments of the present disclosure, the first motor and the engine are disposed in an axial direction of the conversion device, and the conversion device is disposed between the first motor and the engine.

In some embodiments of the present disclosure, the hybrid powertrain further includes an intermediate shaft, an input end of the intermediate shaft is connected to the output shaft, and an output end of the intermediate shaft is connected to a differential.

In some embodiments of the present disclosure, at least two driving gears are arranged on the output shaft, at least two driven gears are sleeved on the intermediate shaft, the driving gears are correspondingly arranged with the driven gears, and the intermediate shaft is in transmission connection with one of the driven gears.

In some embodiments of the present disclosure, a first driving gear and a second driving gear are arranged on the output shaft, a first driven gear and a second driven gear are arranged on the intermediate shaft, the first driving gear corresponds to the first driven gear, and the second driving gear corresponds to the second driven gear.

A synchronizer fastened to the intermediate shaft and is in transmission connection with the first driven gear or the second driven gear.

In some embodiments of the present disclosure, the first motor and the engine are disposed in the axial direction of the conversion device. The conversion device is disposed between the first motor and the engine. The first driving gear, the second driving gear, the first driven gear, and the second driven gear are disposed on a side of the conversion device away from the engine.

In a second aspect, the vehicle according to the present disclosure includes the hybrid powertrain described above.

Other aspects and advantages of the present disclosure will be given in the following description, some of which will become apparent from the following description or may be learned from practices of the present disclosure.

DETAILED DESCRIPTION

Figure 1:
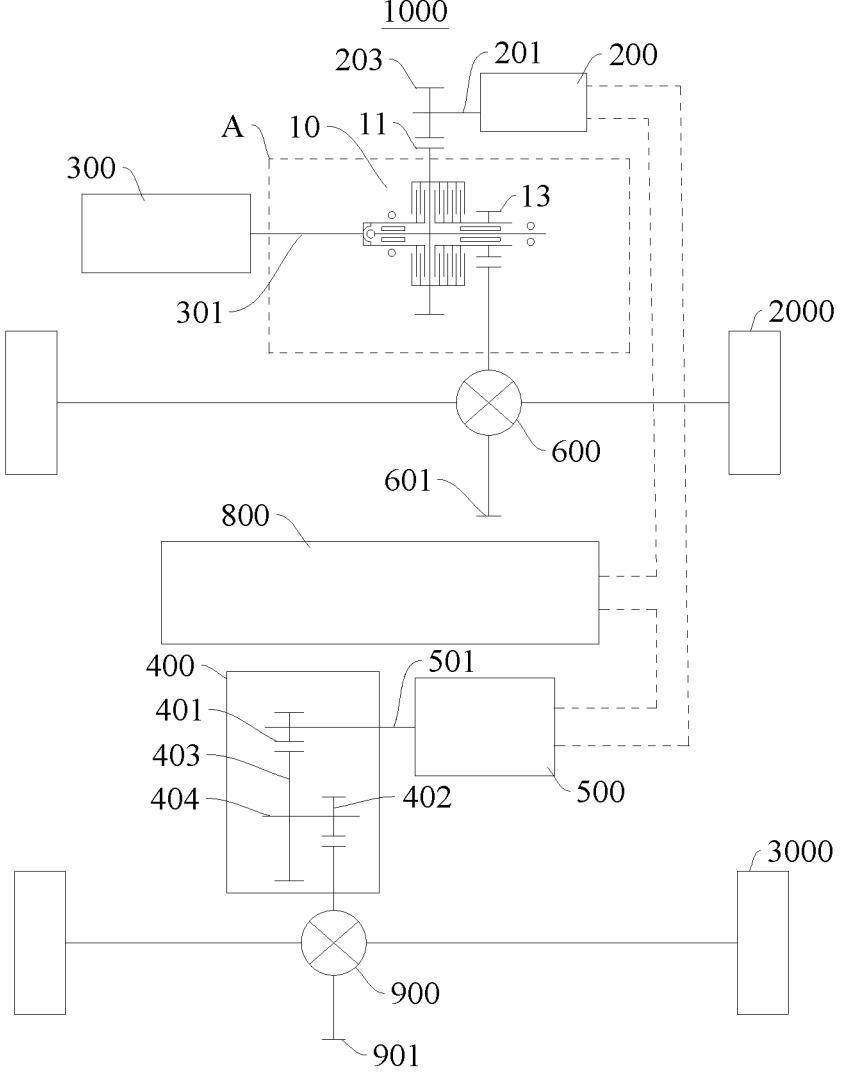
FIG. 1 is a schematic diagram of a hybrid powertrain mounted on a vehicle according to an embodiment of the present disclosure.

Embodiments of the present disclosure are described in detail below, and examples of the embodiments are shown in accompanying drawings, where the same or similar elements or the elements having same or similar functions are denoted by the same or similar reference numerals throughout the description. The embodiments described below with reference to the accompanying drawings are examples and used for explaining the present disclosure, and should not be construed as a limitation on the present disclosure.

A hybrid powertrain 1000 according to embodiments of the present disclosure is described below with reference to FIG. 1 to FIG. 8, and the hybrid powertrain 1000 may be mounted on a vehicle.

As shown in FIG. 1 to FIG. 4, the hybrid powertrain 1000 of the vehicle according to embodiments of the present disclosure includes: a conversion device 10, a first motor 200, and an engine 300. At least one of the first motor 200 and the engine 300 is configured to selectively output a power to a driving end through the conversion device 10, and the driving end may include wheels of the vehicle. To be specific, the first motor 200 may selectively output power to the driving end through the conversion device 10, the engine 300 may selectively output power to the driving end through the conversion device 10, and the first motor 200 and the engine 300 may simultaneously selectively output power to the driving end through the conversion device 10. After the power is output to the driving end, the wheels can rotate to drive the vehicle. That the engine 300 is configured to selectively output power to the first motor 200 through the conversion device 10, and may also be understood as that the engine 300 may select to output the power to the first motor 200 through the conversion device 10 or may select not to output the power to the first motor 200. When the engine 300 outputs the power to the first motor 200 through the conversion device 10, the engine 300 can drive the first motor 200 to generate electricity. The first motor 200 may be configured to selectively output power to the engine 300 through the conversion device 10, to drive the engine 300 to start ignition.

When the engine 300 outputs the power to the driving end, a rotation direction of an engine output shaft 301 of the engine 300 is opposite to a rotation direction of the wheels at the driving end, such that the engine output shaft 301 and the wheels rotate to opposite directions. When the at least one of the first motor 200 and the engine 300 selectively outputs the power to front wheels 2000 or rear wheels 3000 of the driving end through the conversion device 10, for example, when the at least one of the first motor 200 and the engine 300 selectively outputs the power to the front wheels 2000 of the driving end through the conversion device 10, the rotation direction of the engine output shaft 301 of the engine 300 is opposite to a rotation direction of the front wheels 2000. In a rear-forward direction of the vehicle, the engine 300 is arranged/disposed on a left side of the conversion device 10, and the conversion device 10 is in transmission connection with a front differential 600 of the front wheels. The engine 300 is arranged on the left side of the conversion device 10, so that the rotation direction of the engine output shaft 301 of the engine 300 is opposite to the rotation direction of the front wheels 2000. Since the rotation direction of the engine output shaft 301 of the engine 300 is opposite to the rotation direction of the front wheels 2000, there is no need to configure a reversing gear between the conversion device 10 and the front differential 600, the front wheels 2000 can be driven to rotate to drive the vehicle. In addition, the first motor 200 and/or the engine 300 may be switched to selectively output the power to the driving end through the same conversion device 10, and the engine 300 selectively outputs the power to the first motor 200 through the conversion device 10, so that the vehicle can be switched to different driving modes. This can improve driving performance of the vehicle. At the same time, this can simplify a structure of the hybrid powertrain 1000, and make the structure of the hybrid powertrain 1000 compact.

By mounting the hybrid powertrain 1000 on the vehicle, multiple functions of the vehicle can be implemented. Details are as follows.

A function of starting the engine 300 by the first motor 200 having an unloaded state: In this function, neither the first motor 200 nor the engine 300 outputs the power to the driving end through the conversion device 10, and the first motor 200 is in a stationary state at the beginning. After the first motor 200 receives electric energy, the first motor 200 starts to run from the stationary state, and the first motor 200 transmits the power to the engine 300, and drags the engine 300 to start ignition to start the engine 300.

A function of starting the engine 300 by the first motor 200 having a loaded state: In this function, the first motor 200 works, the first motor 200 outputs the power to the driving end through the conversion device 10, the first motor 200 is in a loaded running state, and the first motor 200 transmits the power to the engine 300 through the conversion device 10, and drags the engine 300 to start ignition.

A function of series power generation by the engine 300: In this function, the engine 300 has been in an ignition operation state, neither the first motor 200 nor the engine 300 outputs the power to the driving end, the engine 300 outputs the power to the first motor 200 through the conversion device 10, the first motor 200 works to generate electricity and supplies the electric energy to an energy storage unit 800 and/or a second motor 500, and the second motor 500 can output the power to the rear wheels 3000 when the second motor 500 works. It should be noted that, if the first motor 200 outputs the power to the front wheels 2000, then the second motor 500 outputs the power to the rear wheels 3000. If the first motor 200 outputs the power to the rear wheels 3000, then the second motor 500 outputs, when working, the power to the front wheels 2000. The present disclosure takes an example in which the first motor 200 outputs the power to the front wheels 2000 and the second motor 500 outputs the power to the rear wheels 3000.

A function of parallel power generation by the engine 300: In this function, the engine 300 is in an ignition operation state, the engine 300 outputs the power to the driving end through the conversion device 10, the engine 300 drives the vehicle to run, and the engine 300 outputs the power to the first motor 200 through the conversion device 10, to drag the first motor 200 to rotate to drive the first motor 200 to generate electricity. The first motor 200 switches to a generator mode, and the engine 300 drives the first motor 200 to generate electricity and supplies the electric energy to the energy storage unit 800 or the second motor 500.

In this way, the first motor 200 and the engine 300 work together through the conversion device 10, the first motor 200 and the engine 300 selectively output the power to the driving end through the same conversion device 10, the hybrid powertrain 1000 does not need to be provided with a reversing gear. This can simplify a structure of the hybrid powertrain 1000, so that the structure of the hybrid powertrain 1000 is compact. In addition, the first motor 200 and/or the engine 300 are/is switched to selectively output the power to the driving end through the same conversion device 10, and the engine 300 selectively outputs the power to the first motor 200 through the conversion device 10, so that the vehicle can be switched to different driving modes. This can improve driving performance of the vehicle.

Figure 2:
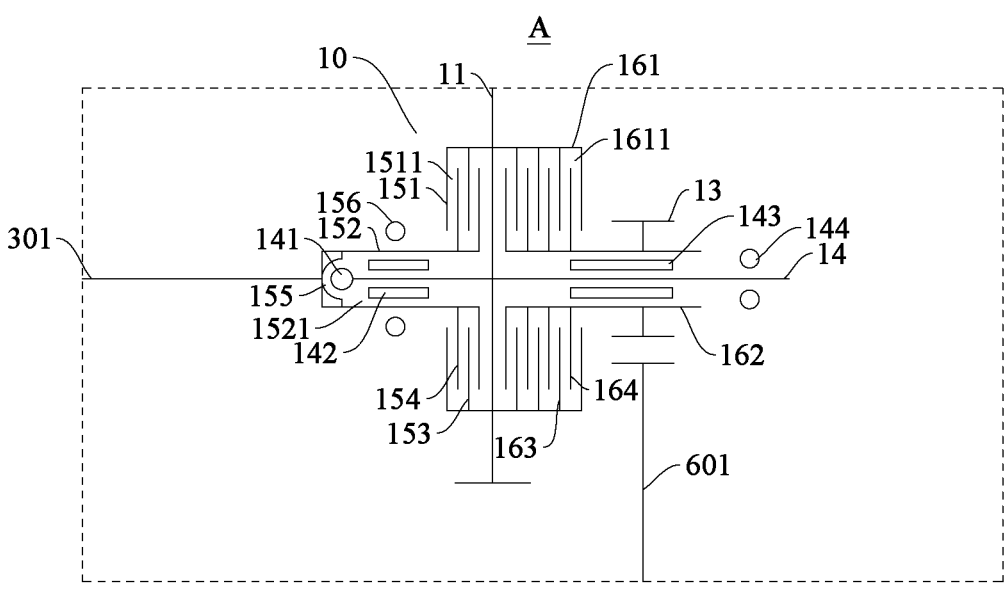
FIG. 2 is an enlarged view of a part A in FIG. 1.
Figure 3:
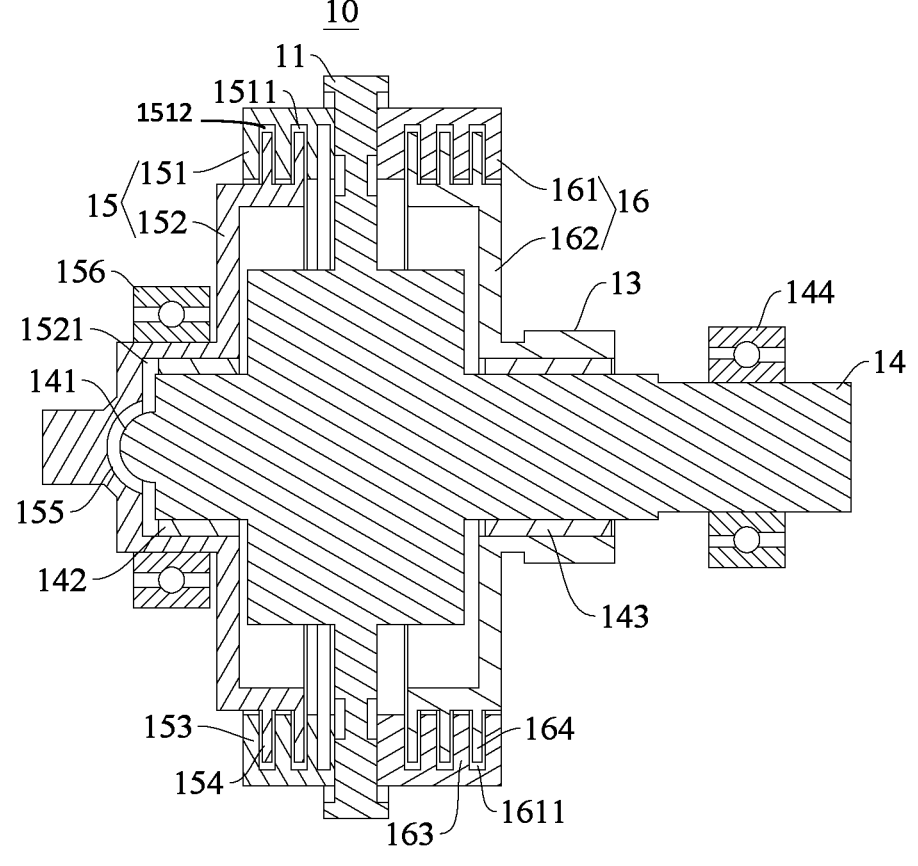
FIG. 3 is a sectional view of a conversion device of a hybrid powertrain according to an embodiment of the present disclosure.

In some embodiments of the present disclosure, as shown in FIG. 2 and FIG. 3, the conversion device 10 may include: a first clutch assembly 15, a second clutch assembly 16, and a transmission piece 11. The first motor 200 is in transmission connection with the transmission piece 11, and the first motor 200 is configured to output the power to the transmission piece 11. The first clutch assembly 15 is connected between the engine output shaft 301 and the transmission piece 11 that are engaged or disconnected through the first clutch assembly 15, so that the engine 300 selectively outputs the power to the first motor 200. In an embodiment, when the first clutch assembly 15 is engaged, the engine 300 can output power to the first motor 200, and when the first clutch assembly 15 is disconnected, the engine 300 cannot output power to the first motor 200, such that the engine 300 may select to output the power or not output the power to the first motor 200. The second clutch assembly 16 is connected between the transmission piece 11 and the front differential 600 of the front wheels, and the second clutch assembly 16 is engaged or disconnected to selectively connect the transmission piece 11 to the front wheels 2000. In an embodiment, when the second clutch assembly 16 is engaged, the transmission piece 11 is connected to the front wheels 2000, and the power on the transmission piece 11 can be transmitted to the front wheels 2000 to drive the vehicle to run. When the second clutch assembly 16 is disconnected, the transmission piece 11 is not connected to the front wheel 2000, and the power on the transmission piece 11 cannot be transmitted to the front wheels 2000. A torque of the first clutch assembly 15 may be greater than a torque of the second clutch assembly 16.

In some embodiments of the present disclosure, as shown in FIG. 3, the first clutch assembly 15 includes a first engagement portion 151 and a second engagement portion 152. The first engagement portion 151 may be fastened to the transmission piece 11, for example, through bolts. The first engagement portion 151 may be welded to the transmission piece 11, or may be clamped to the transmission piece 11, to implement a fastening connection between the first engagement portion 151 and the transmission piece 11.

The first engagement portion 151 includes a housing 1512. A first groove 1511 is formed in the housing. A first friction plate 153 is arranged/disposed in the housing. The second engagement portion 152 is configured to be selectively engaged with the first friction plate 153 in the first groove 1511. The second engagement portion 152 is connected to the engine output shaft 301. The second engagement portion 152 is fastened to the engine output shaft 301. A fastening connection mode of the second engagement portion 152 and the engine output shaft 301 is not limited. Multiple first friction plates 153 may be arranged. The multiple first friction plates 153 are sequentially spaced in the axial direction of the conversion device 10. A first groove 1511 is formed between adjacent first friction plates 153. The second engagement portion 152 includes at least one second friction plate 154. For example, there are multiple second friction plates 154. The multiple second friction plates 154 and the multiple first friction plates 153 are one-to-one arranged. The second friction plate 154 extends into the first groove 1511. The first friction plates 153 and the second friction plates 154 are engaged or disconnected by relative movement of the second friction plates 154 and the first friction plates 153, so that the engine 300 selectively outputs the power to the transmission piece 11.

In some embodiments of the present disclosure, as shown in FIG. 3, the first clutch assembly 15 may include a third engagement portion 161 and a fourth engagement portion 162. The third engagement portion 161 can be fastened to the transmission piece 11, for example, through bolts. The third engagement portion 161 may be welded to the transmission piece 11, or may be clamped to the transmission piece 11, to implement a fastening connection between the third engagement portion 161 and the transmission piece 11.

The third engagement portion 161 includes a housing. A second groove 1611 is formed in the housing. A third friction plate 163 is provided in the second groove 1611. The fourth engagement portion 162 is configured to be selectively engaged with the second groove 1611. The fourth engagement portion 162 is connected to the front differential 600. The fourth engagement portion 162 is in transmission connection with the front differential 600. Multiple third friction plates 163 may be arranged. The multiple third friction plates 163 are sequentially spaced in the axial direction of the conversion device 10. A second groove 1611 is formed between adjacent third friction plates 163. The fourth engagement portion 162 includes at least one fourth friction plate 164. For example, there are multiple fourth friction plates 164. The multiple fourth friction plates 164 and the multiple second grooves 1611 are one-to-one arranged. The fourth friction plate 164 extends into the second groove 1611. The third friction plates 163 and the fourth friction plates 164 are engaged or disconnected by relative movement of the fourth friction plates 164 and the third friction plates 163, to implement that the transmission piece 11 selectively outputs the power to the front differential 600, to selectively output the power to the front wheels 2000 to drive the vehicle to run.

In some embodiments of the present disclosure, as shown in FIG. 3, the first engagement portion 151 is fastened to the transmission piece 11 and located on a side of the transmission piece 11 that is close to the engine, and the third engagement portion 161 is fastened to the transmission piece 11 and located on a side of the transmission piece 11 that is away from the engine. In other words, the first engagement portion 151 is provided on one side of the transmission piece 11 and the third engagement portion 161 is provided on the other side of the transmission piece 11. A radial size of the conversion device 10 can be reduced by arranging the first engagement portion 151 and the third engagement portion 161 on both sides in the axial direction of the transmission piece 11.

In some embodiments of the present disclosure, the first engagement portion 151 and the third engagement portion 161 are integrally formed with the transmission piece 11. In other words, the first engagement portion 151 and the transmission piece 11 are formed as an integrally formed piece, and the third engagement portion 161 and the transmission piece 11 are formed as an integrally formed piece. This arrangement can improve the connection strength between the first engagement portion 151 and the transmission piece 11 and between the third engagement portion 161 and the transmission piece 11, and can avoid the separation between the first engagement portion 151 and the transmission piece 11 and the separation between the third engagement portion 161 and the transmission piece 11. In addition, this can also avoid a step of producing the first engagement portion 151 and the third engagement portion 161 separately, reduce mold development costs, reduce production costs of the conversion device 10, and improve production efficiency of the conversion device 10 and integration.

In some embodiments of the present disclosure, the transmission piece 11 includes a gear, a first motor gear 203 is arranged/disposed on a first motor output shaft 201, the first motor gear 203 and the transmission piece 11 form a gear pair, and the gear pair is configured to be connected to the first motor 200 and the engine 300. In this embodiment, the first motor 200 is connected to the engine by the gear pair, so that boost generation can be implemented, and integration of the first clutch assembly 15 and the second clutch assembly 16 can be implemented by using gears.

In some embodiments of the present disclosure, the first engagement portion 151 is connected to the third engagement portion 161 to form a clutch body, and the transmission piece 11 is arranged/disposed on the clutch body. In this case, it can be understood that the housing of the first clutch assembly 15 is connected to the housing of the second clutch assembly 16, and then the clutch body for mounting the transmission piece is formed, or an outer periphery of the clutch body is formed with teeth as a gear. In this case, the first engagement portion 151, the third engagement portion 161, and the transmission piece 11 are integrally formed.

In some embodiments, the first engagement portion 151 and the third engagement portion 161 are integrally formed to form the clutch body described above.

In some embodiments of the present disclosure, as shown in FIG. 1 to FIG. 3, the hybrid powertrain 1000 may further include: a support shaft 14. The transmission piece 11 is connected to the support shaft 14, and the transmission piece 11 is coaxially arranged with the support shaft 14. The transmission piece 11 can be configured as a transmission gear. The transmission piece 11 may be sleeved on the support shaft 14. The transmission piece 11 is fastened to the support shaft 14. A central axis of the transmission piece 11 coincides with a central axis of the support shaft 14. The second engagement portion 152 and the fourth engagement portion 162 are rotatably sleeved on the support shaft 14, and second engagement portion 152 and the fourth engagement portion 162 are rotatable with respect to the support shaft 14. The first engagement portion 151 and the third engagement portion 161 are both connected to the transmission piece 11. With this configuration, the first clutch assembly 15, the second clutch assembly 16, and the transmission piece 11 may be integrally arranged/disposed on the same support shaft 14, so that a structure of the conversion device 10 is compact, and a volume of the conversion device 10 is reduced. That the conversion device 10 occupies a small space is conducive to mounting of the conversion device 10, and facilitates disposing of the hybrid powertrain 1000 on the vehicle. This improves the production efficiency of the vehicle.

In some embodiments of the present disclosure, as shown in FIG. 3, a chamber 1521 is formed on the second engagement portion 152, and one end of the support shaft 14 is located in the chamber 1521 and rotatably connected to the second engagement portion 152. It should be noted that, in an axial direction of the support shaft 14, an end portion of the support shaft 14 that is adjacent to the second engagement portion 152 is located in the chamber 1521 and is rotatably connected to the second engagement portion 152. The second engagement portion 152 is sleeved at the end portion of the support shaft 14 that is adjacent to the second engagement portion 152. The second engagement portion 152 being rotatably connected to the support shaft 14 can ensure that the second engagement portion 152 can rotate relative to the support shaft 14, and ensure the operational performance of the conversion device 10. Furthermore, by disposing the end portion of the support shaft 14 that is adjacent to the second engagement portion 152 in the chamber 1521, an axial size of the conversion device 10 can be reduced, so that the structure of the conversion device 10 is more compact.

In some embodiments of the present disclosure, as shown in FIG. 3, a first limiting portion 155 is provided in the chamber 1521, a second limiting portion 141 is provided at one end (e.g., a first end) of the support shaft 14, and the first limiting portion 155 and the second limiting portion 141 cooperate to limit axial movement of the support shaft 14. It should be noted that, a second limiting portion 141 is provided at the end portion of the support shaft 14 that is adjacent to the second engagement portion 152, and a first limiting portion 155 is provided at a bottom wall of the chamber 1521 that is opposite to the end portion of the support shaft 14. After the conversion device 10 is mounted on the support shaft 14, when the support shaft 14 is subjected to an axial force toward the second engagement portion 152, abutment and limitation of the first limiting portion 155 and the second limiting portion 141 limits the axial movement of the support shaft 14. This can prevent the support shaft 14 from moving abnormally in the axial direction, and implement limitation and protection when the support shaft 14 is subjected to a large axial force.

As shown in FIG. 3, the first limiting portion 155 may be a spherical groove, the second limiting portion 141 may be a spherical protrusion, the spherical protrusion is mounted in the spherical groove, the spherical protrusion is concentrically arranged/disposed with the spherical groove, such that a center of the spherical protrusion is aligned with a center of the spherical groove, and an inner wall of the spherical groove is spaced apart from the spherical protrusion. After the conversion device 10 is mounted on the support shaft 14, the spherical protrusion is mounted in the spherical groove. Configuration of the spherical protrusion and the spherical groove can ensure that the second engagement portion 152 and the support shaft 14 can rotate relative to each other. In addition, even if the first limiting portion 155 is in contact with the second limiting portion 141, the configuration of the spherical protrusion and the spherical groove can ensure that the second engagement portion 152 and the support shaft 14 can rotate relative to each other, and can ensure the operational performance of the conversion device 10.

In some embodiments of the present disclosure, as shown in FIG. 3, the hybrid powertrain 1000 may further include: a first bearing 142. The second engagement portion 152 is rotatably connected to the support shaft 14 through the first bearing 142. The first bearing 142 is sleeved on the support shaft 14, and the first bearing 142 is arranged/disposed between the second engagement portion 152 and the support shaft 14, to implement the relative rotation between the second engagement portion 152 and the support shaft 14. In addition, configuring the first bearing 142 between the second engagement portion 152 and the support shaft 14 can ensure that the second engagement portion 152 and the support shaft 14 can rotate with respect to a same axis, ensure that the relative rotation between the second engagement portion 152 and the support shaft 14 is smooth, and can avoid the radial movement of the second engagement portion 152 relative to the support shaft 14.

In some embodiments of the present disclosure, the hybrid powertrain 1000 may further include: a housing (not shown in the figure). The second engagement portion 152 is rotatably connected to the housing. Besides ensuring that the second engagement portion 152 is rotatable relative to the support shaft 14, by rotatably connecting the second engagement portion 152 to the housing, the second engagement portion 152 can be reliably mounted in the housing of the hybrid powertrain 1000.

In some embodiments of the present disclosure, the second engagement portion 152 and the housing are connected at a first connecting position, and the second engagement portion 152 and the support shaft 14 are connected at a second connecting position. In a radial direction of the support shaft 14, an orthographic projection of the first connecting position at least partially overlaps with an orthographic projection of the second connecting position. This configuration can enable a radial load of the support shaft 14 to be transmitted to the housing through the second engagement portion 152, avoid a shearing force caused by staggering of the first connecting position and the second connecting position in the radial direction of the support shaft 14, and avoid affecting a lifespan of the entire hybrid powertrain 1000.

In some embodiments of the present disclosure, as shown in FIG. 3, the hybrid powertrain 1000 may further include: a first bearing 142 and a second bearing 156. The first bearing 142 is arranged/disposed between the second engagement portion 152 and the support shaft 14. The first bearing 142 is sleeved on the support shaft 14. The first bearing 142 is arranged between the second engagement portion 152 and the support shaft 14. The second bearing 156 is sleeved on the second engagement portion 152. In the radial direction of the support shaft 14, an orthographic projection of the second bearing 156 at least partially overlaps with an orthographic projection of the first bearing 142. The second bearing 156 is arranged/disposed at the first connecting position. The first bearing 142 is provided at the second connecting position. The second engagement portion 152 is rotatably connected to the housing through the second bearing 156. This configuration enables a radial load of the support shaft 14 to be transmitted to the housing through the first bearing 142, the second engagement portion 152, and the second bearing 156. This avoids a shearing force caused by staggering of the first bearing 142 and the second bearing 156 in the radial direction of the support shaft 14, and prevents the shearing force from affecting the lifespan of the entire hybrid powertrain 1000, to prolonging a service life of the hybrid powertrain 1000.

In some embodiments of the present disclosure, as shown in FIG. 3, the hybrid powertrain 1000 may further include: a third bearing 143. The fourth engagement portion 162 is rotatably connected to the support shaft 14 through the third bearing 143. The third bearing 143 is sleeved on the support shaft 14, and the third bearing 143 is arranged/disposed between the fourth engagement portion 162 and the support shaft 14, to implement the relative rotation between the fourth engagement portion 162 and the support shaft 14. In addition, configuring the third bearing 143 between the fourth engagement portion 162 and the support shaft 14 can ensure that the fourth engagement portion 162 and the support shaft 14 can rotate with respect to a same axis, ensure that the relative rotation between the fourth engagement portion 162 and the support shaft 14 is smooth, and can avoid radial movement of the fourth engagement portion 162 relative to the support shaft 14.

In some embodiments of the present disclosure, the hybrid powertrain 1000 may further include: a housing (not shown in the figure). The other end (e.g., a second end) of the support shaft 14 is rotatably connected to the housing. The other end of the support shaft 14 means the end of the support shaft 14 that is away from the second engagement portion 152 in the axial direction of the support shaft 14.

Besides ensuring that the support shaft 14 is rotatable relative to the housing, this configuration can enable the support shaft 14 to be reliably mounted on the housing of the hybrid powertrain 1000, so that the support shaft 14 can reliably support the conversion device 10, to ensure the operational performance of the conversion device 10.

In some embodiments of the present disclosure, as shown in FIG. 3, the hybrid powertrain 1000 may further include: a fourth bearing 144. The other end of the support shaft 14 is rotatably connected to the housing through the fourth bearing 144. The fourth bearing 144 is sleeved on the support shaft 14. The fourth bearing 144 is connected between the support shaft 14 and the housing. The support shaft 14 is mounted and fastened by the fourth bearing 144, so that the support shaft 14 can rotate relative to the housing. This configuration can enable the support shaft 14 to be reliably mounted on the housing of the hybrid powertrain 1000, so that the support shaft 14 can reliably support the conversion device 10, to ensure the operational performance of the conversion device 10.

In some embodiments of the present disclosure, as shown in FIG. 1 and FIG. 3, the front differential 600 has a first gear 601, and the second clutch assembly 16 is provided with a first output gear 13. The first output gear 13 is meshed with the first gear 601. The fourth engagement portion 162 of the second clutch assembly 16 is provided with the first output gear 13. The first output gear 13 is provided outside the fourth engagement portion 162. The first output gear 13 may be integrally formed with the fourth engagement portion 162, to reduce mold development costs and production costs of the conversion device 10. When the fourth engagement portion 162 is engaged with the third engagement portion 161, the power on the transmission piece 11 is transmitted to the front differential 600 through the second clutch assembly 16, the first output gear 13, and the first gear 601, and the power is transmitted to the front wheels 2000 of the vehicle through the front differential 600, to drive the vehicle to run. In addition, the first gear 601 and the first output gear 13 are meshed to transmit the power, so that the power can be reliably transmitted to the front differential 600.

In some embodiments of the present disclosure, as shown in FIG. 1, a central axis of the first gear 601 is parallel to a central axis of the first output gear 13. This configuration can enable the first gear 601 and the first output gear 13 to be reliably meshed, avoid the separation of the first gear 601 and the first output gear 13, ensure the power to be reliably transmitted to the front differential 600, reduce wear between the first gear 601 and the first output gear 13, and prolong a service life of the first gear 601 and the first output gear 13.

In some embodiments of the present disclosure, as shown in FIG. 1, the hybrid powertrain 1000 may further include: an energy storage unit 800. The energy storage unit 800 may be a battery pack. The energy storage unit 800 is electrically connected to the first motor 200. The energy storage unit 800 can supply power to the first motor 200, to drive the first motor 200 to work, so that the first motor 200 may output the power to the transmission piece 11, to drive the first motor 200 to work.

In some embodiments of the present disclosure, the first motor output shaft 201 of the first motor 200 is meshed and in transmission with the transmission piece 11, and the first motor gear 203 is disposed on the first motor output shaft 201. The first motor gear 203 is meshed and in transmission with the transmission piece 11. The first motor output shaft 201 is meshed and in transmission with the transmission piece 11, so that power transmission from the first motor output shaft 201 to the transmission piece 11 can be implemented, and power transmission from the transmission piece 11 to the first motor output shaft 201 can also be implemented.

In some embodiments of the present disclosure, as shown in FIG. 1, the first motor output shaft 201 and the engine output shaft 301 are parallel. This configuration can facilitate the configuration of the first motor 200 and the engine 300, and can avoid the interference between the first motor 200 and the engine 300.

In some embodiments of the present disclosure, as shown in FIG. 1, the hybrid powertrain 1000 may further include: a second motor 500 and a transmission 400. The transmission 400 is connected between the second motor 500 and a rear differential 900 of the rear wheels. The second motor 500 outputs power to the rear wheels 3000 through the transmission 400. As shown in FIG. 1, the transmission 400 includes a transmission input gear 401 and a transmission output gear 402. The transmission input gear 401 is in transmission connection with the transmission output gear 402. The transmission input gear 401 is fastened to the second motor output shaft 501 of the second motor 500. The rear differential 900 has a second gear 901. The transmission output gear 402 is meshed and in transmission with the second gear 901. The transmission 400 also includes a transmission gear 403. The transmission gear 403 and the transmission output gear 402 are mounted on a same connection shaft, the transmission gear 403 is meshed with the transmission input gear 401, and the transmission output gear 402 is meshed and in transmission with the second gear 901.

The second motor 500 is electrically connected to the energy storage unit 800, and the energy storage unit 800 can supply power to the second motor 500 to enable the second motor 500 to work. When the second motor 500 works, the second motor output shaft 501 of the second motor 500 drives the transmission input gear 401 to rotate. When the transmission input gear 401 rotates, the transmission input gear 401 drives the transmission gear 403 to rotate. The transmission gear 403 drives the transmission output gear 402 to rotate. When the transmission output gear 402 rotates, the transmission output gear 402 drives the second gear 901 to rotate to output power to the rear differential 900. The power is output to the rear wheels 3000 through the rear differential 900, to drive the rear wheels 3000 to rotate.

Figure 4:
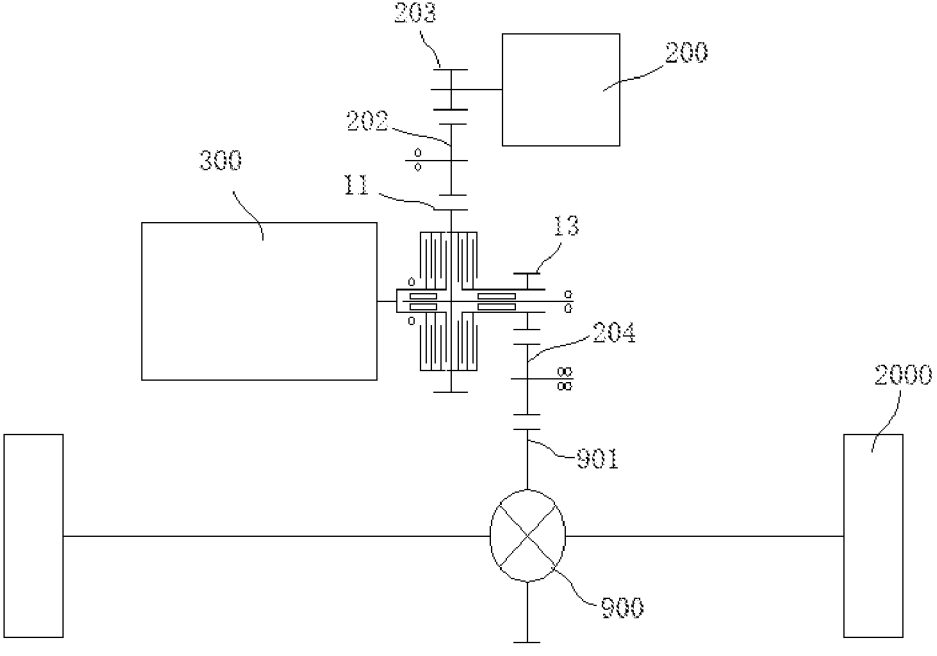
FIG. 4 is a schematic diagram of another embodiment of a hybrid powertrain according to an embodiment of the present disclosure.
Figure 5:
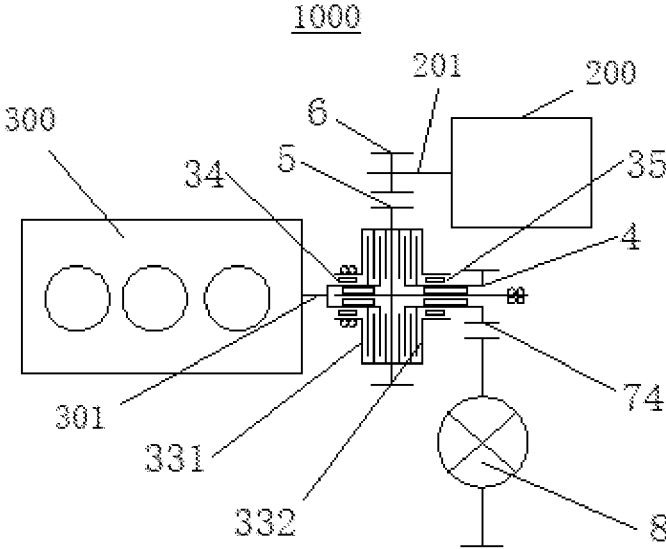
FIG. 5 is a schematic diagram of a structure of a powertrain according to an embodiment of the present disclosure.
Figure 6:
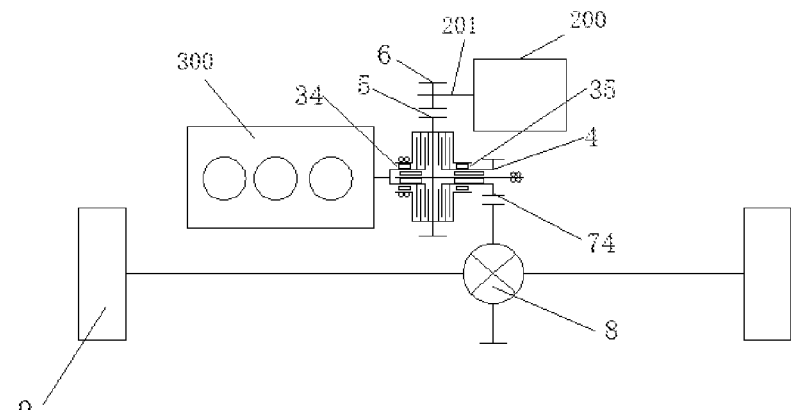
FIG. 6 is a schematic diagram of another structure of a powertrain according to an embodiment of the present disclosure.
Figure 7:
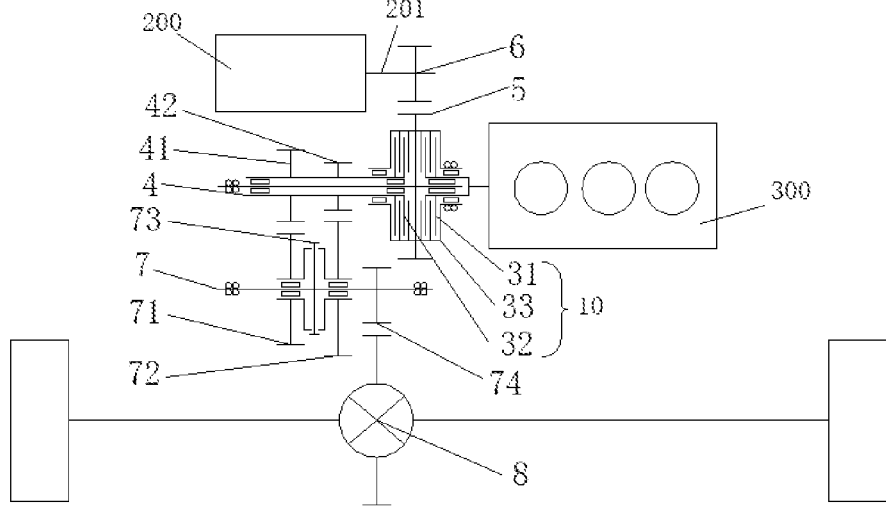
FIG. 7 is a schematic diagram of another structure of a powertrain according to another embodiment of the present disclosure.
Figure 8:
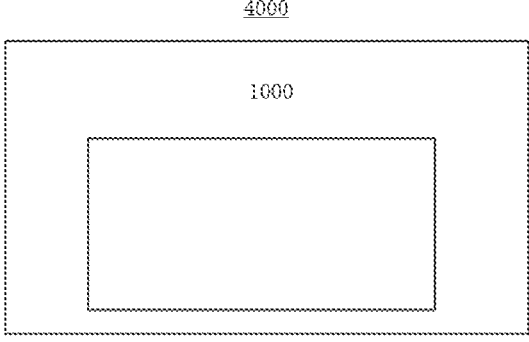
FIG. 8 is a schematic diagram of a structure of a vehicle according to an embodiment of the disclosure.

In some embodiments of the present disclosure, as shown in FIG. 4, a first intermediate gear 202 is meshed between the first motor gear 203 of the first motor output shaft 201 and the transmission piece 11. The first intermediate gear 202 may be rotatably mounted on the housing. The first intermediate gear 202 transmits power between the first motor output shaft 201 and the transmission piece 11. A second intermediate gear 204 may be meshed between the first output gear 13 and the second gear 901. The second intermediate gear 204 may be rotatably mounted on the housing. The second intermediate gear 204 transmits power between the first output gear 13 and the second gear 901. In this embodiment, a difference from the embodiment in FIG. 1 lie in that the first intermediate gear 202 is meshed between the first motor gear 203 and the transmission piece 11. The second intermediate gear 204 is meshed between the first output gear 13 and the second gear 901.

It should be noted that, the conversion device 10, the first motor 200, and the engine 300 are mechanically connected to form a front powertrain. The front powertrain can drive the front wheels 2000 to rotate. The transmission 400, the second motor 500, and the rear differential 900 are mechanically connected to form a rear electric assembly. The rear electric assembly can drive the rear wheels 3000 to rotate. The energy storage unit 800 is electrically connected to the first motor 200 and the second motor 500. The present disclosure also provides a hybrid four-wheel drive system, including the hybrid powertrain, the front powertrain, and the rear powertrain.

By mounting the hybrid powertrain 1000 on the vehicle, multiple functions of the vehicle can be implemented. Details are as follows.

A function of starting the engine 300 by the first motor 200 having an unloaded state: In this function, the fourth engagement portion 162 is disconnected from the third engagement portion 161, and the first motor 200 is in the stationary state. The energy storage unit 800 starts to supply power to the first motor 200. The first motor 200 starts to run from the stationary state. Then the second engagement portion 152 is engaged with the first engagement portion 151. The power is transmitted to the engine 300 through the first motor gear 203, the transmission piece 11, the first engagement portion 151, and the second engagement portion 152, to drag the engine 300 to start ignition.

A function of starting the engine 300 by the first motor 200 having a loaded state: In this function, the third engagement portion 161 is engaged with the fourth engagement portion 162. The energy storage unit 800 supplies power to the first motor 200. The first motor 200 is in a loaded running state. The second engagement portion 152 starts to be engaged with the first engagement portion 151 in sliding friction manner, and transmits power to the engine 300 through the second engagement portion 152, to drag the engine 300 to start ignition.

A function of series power generation by the engine 300: In this function, the engine 300 has been in the ignition operation. The fourth engagement portion 162 is disconnected from the third engagement portion 161. The first engagement portion 151 starts to be engaged with the second engagement portion 152. The engine 300 transmits power to the first motor 200 through the second engagement portion 152, the first engagement portion 151, the transmission piece 11, and the first motor gear 203. The first motor 200 works to generate electricity and supplies electric energy to the energy storage unit 800 and/or the second motor 500.

A function of parallel power generation by the engine 300: In this function, the engine 300 is in an ignition operation state, the first engagement portion 151 is engaged with the second engagement portion 152, and the fourth engagement portion 162 is engaged with the third engagement portion 161. The engine 300 drives the vehicle to run and drags the first motor 200 to rotate, the first motor 200 switches to a generator mode, and the engine 300 drives the first motor 200 to generate electricity and supply electric energy to the energy storage unit 800 and/or the second motor 500.

A function of recovering braking energy by the second motor 500 during driving: In this function, the fourth engagement portion 162 is disconnected from the third engagement portion 161, and the second engagement portion 152 is disconnected from the first engagement portion 151. The vehicle transmits power to the second motor 500 through the rear wheels (such as a rear transmission shaft), the rear differential 900, and the transmission 400. The second motor 500 works to generate electricity and supply electric energy to the energy storage unit 800 and/or the first motor 200. This function is suitable for medium and light braking conditions.

A function of recovering braking energy by the first motor 200 and the second motor 500 together during driving: In this function, the fourth engagement portion 162 is engaged with the third engagement portion 161, and the second engagement portion 152 is disconnected from the first engagement portion 151. The vehicle transmits power to the second motor 500 through the rear wheels (such as the rear transmission shaft), the rear differential 900, and the transmission 400, and transmits power to the first motor 200 through the front wheels (such as a front transmission shaft), the front differential 600, and the conversion device 10. The first motor 200 and the second motor 500 work together to generate electricity and supply electric energy to the energy storage unit 800. This function is suitable for medium and heavy braking conditions.

After the hybrid powertrain 1000 is installed on the vehicle, various driving modes of the vehicle can be implemented, and the implementations are as follows.

An EV front-wheel drive mode: In this mode, the fourth engagement portion 162 is engaged with the third engagement portion 161, and the second engagement portion 152 is disconnected from the first engagement portion 151. The energy storage unit 800 supplies power to the first motor 200, and the first motor 200 works and transmits power to the front wheels 2000 through the first motor gear 203, the transmission piece 11, the third engagement portion 161, the fourth engagement portion 162, the first output gear 13, the first gear 601, the front differential 600, and the front transmission shaft, to drag the entire vehicle to run.

An EV rear-wheel drive mode: In this mode, the fourth engagement portion 162 is disconnected from the third engagement portion 161, and the second engagement portion 152 is disconnected from the first engagement portion 151. The energy storage unit 800 supplies power to the second motor 500. The second motor 500 works and transmits power to the rear wheels 3000 through the transmission 400, the rear differential 900, the second gear 901, and the rear transmission shaft, to drag the entire vehicle to run.

An EV four-wheel drive mode: In this mode, the fourth engagement portion 162 is engaged with the third engagement portion 161, and the second engagement portion 152 is disconnected from the first engagement portion 151. The energy storage unit 800 supplies power to the first motor 200, and the first motor 200 works and transmits power to the front wheels 2000 through the first motor gear 203, the transmission piece 11, the third engagement portion 161, the fourth engagement portion 162, the first output gear 13, the first gear 601, the front differential 600, and the front transmission shaft. The energy storage unit 800 simultaneously supplies power to the second motor 500. The second motor 500 works and transmits power to the rear wheels 3000 through the transmission 400, the rear differential 900, and the rear transmission shaft. The first motor 200 and the second motor 500 work together to drag the entire vehicle to run.

An HEV front-wheel drive mode: In this mode, the engine 300 is in an ignition operation state, the fourth engagement portion 162 is engaged with the third engagement portion 161, and the second engagement portion 152 is engaged with the first engagement portion 151. The engine 300 transmits power to the front wheels 2000 through the second engagement portion 152, the first engagement portion 151, the fourth engagement portion 162, the first output gear 13, the first gear 601, the front differential 600, and the front transmission shaft, to drag the entire vehicle to run. When the power is insufficient, the energy storage unit 800 supplies power to the first motor 200, to assist the engine 300 to drive the entire vehicle to run. When the power is surplus, the first motor 200 generates electricity and supplies electric energy to the energy storage unit 800.

An HEV rear-wheel drive mode: In this mode, the engine 300 is in an ignition operation state, the fourth engagement portion 162 is disconnected from the third engagement portion 161, and the second engagement portion 152 is engaged with the first engagement portion 151. The engine 300 transmits power to the first motor 200 through the second engagement portion 152, the first engagement portion 151, the transmission piece 11, and the first motor gear 203. The first motor 200 works to generate electricity and supplies electric energy to the second motor 500. The second motor 500 works and transmits power to the rear wheels 3000 through the transmission 400, the rear differential 900, and the rear transmission shaft, to drag the entire vehicle to run. When the power is insufficient, the energy storage unit 800 supplements power to the second motor 500, to assist in driving the entire vehicle. When there is excess power, the first motor 200 supplies the surplus energy to the energy storage unit 800.

An HEV four-wheel drive mode: In this mode, the engine 300 is in an ignition operation state, the fourth engagement portion 162 is engaged with the third engagement portion 161, and the second engagement portion 152 is engaged with the first engagement portion 151. The first motor 200 transmits power to the front wheels 2000 through the second engagement portion 152, the first engagement portion 151, the fourth engagement portion 162, the first output gear 13, the first gear 601, the front differential 600, and the front transmission shaft, to drag the entire vehicle to run. At the same time, the energy storage unit 800 supplies power to the second motor 500, and the second motor 500 works and transmits power to the rear wheels 3000 through the transmission 400, the rear differential 900, and the rear transmission shaft, to drag the entire vehicle to run together. When the power is insufficient, the energy storage unit 800 supplies power to the first motor 200, to assist in driving the entire vehicle to run. When the power is surplus, the first motor 200 generates electricity and supplies electric energy to the energy storage unit 800.

It should be noted that, a type (for example, naturally aspirated, or turbocharged) of the engine 300, a performance parameter (for example, displacement, power, and a torque) of the engine 300, and a size parameter of the engine 300 are chosen according to an actual condition. Types, performance parameters, size parameters, and the like of the first motor 200 and the second motor 500 can be selected according to the actual situation.

As shown in FIG. 5 to FIG. 8, according to some embodiments of the present disclosure, the hybrid powertrain 1000 includes an engine 300, a first motor 200, a conversion device 10, and an output shaft 4. The conversion device 10 includes a first clutch plate 31, a second clutch plate 32, and a clutch housing 33. The engine 300 is in transmission connection with the first clutch plate 31 through an engine output shaft 301, the first motor 200 is in transmission connection with the clutch housing 33 through a first motor output shaft 201, and the output shaft 4 is in transmission connection with the second clutch plate 32. The clutch housing 33 is selectively engaged with the first clutch plate 31 to enable the hybrid powertrain to be in a power generation mode or a starting mode. In an embodiment, the clutch housing 33 is selectively engaged with the second clutch plate 32 to enable the hybrid powertrain to be in a pure electric drive mode or a braking feedback mode. In an embodiment, the clutch housing 33 is engaged with the first clutch plate 31 and the second clutch plate 32 to enable the hybrid powertrain to be in one of a hybrid drive mode, a drive-while-generating mode, or an engine direct drive mode.

In some embodiments of the present disclosure, the hybrid powertrain 1000 includes an engine 300, a first motor 200, a conversion device 10, and an output shaft 4. The engine 300 is connected to the first clutch plate 31 through the engine output shaft 301, the first motor 200 is connected to the clutch housing 33 through a first motor output shaft 201, and the output shaft 4 is connected to the second clutch plate 32. The first clutch plate 31 and the second clutch plate 32 may be selectively connected to the clutch housing 33, and the output shaft 4 may be connected to a differential 8, to output power of the engine 300 and the first motor 200 to wheels 9, to drive the vehicle to travel, or to transmit power of the wheels 9 to the first motor 200 to drive the first motor 200 to generate electricity.

In some embodiments of the present disclosure, various operation modes may be implemented by controlling the clutch housing 33 to be connected to or disconnected from the first clutch plate 31 and the second clutch plate 32.

The hybrid drive mode: The clutch housing 33 may be connected to the first clutch plate 31 and the second clutch plate 32 at the same time. If the engine 300 and the first motor 200 output power at the same time, the power output from the engine 300 and the first motor 200 is transmitted to the output shaft 4 through the clutch, to drive the vehicle through the output shaft 4 together.

The drive-while-generating mode: The clutch housing 33 may be connected to the first clutch plate 31 and the second clutch plate 32 at the same time. Power output from the engine 300 is transmitted to the output shaft 4 through the first clutch plate 31, the clutch housing 33, and the second clutch plate 32. At the same time, the power output from the engine 300 can also be transmitted to the motor through the first clutch plate 31 and the clutch housing 33, to drive the motor to generate electricity.

The engine direct drive mode: The clutch housing 33 may be connected to the first clutch plate 31 and the second clutch plate 32 at the same time. Power output from the engine 300 is transmitted to the output shaft 4 through the first clutch plate 31, the clutch housing 33, and the second clutch plate 32, to implement the independent power output of the engine 300.

The pure electric drive mode: The clutch housing 33 is connected to the second clutch plate 32 and is disconnected from the first clutch plate 31. At this time, the power of the first motor 200 is output to the output shaft 4 through the clutch housing 33 and the second clutch plate 32, so that the output shaft 4 can output the power of the first motor 200, to drive the vehicle.

The braking feedback mode: The clutch housing 33 is connected to the second clutch plate 32 and is disconnected from the first clutch plate 31. Power of the wheels 9 can be transmitted to the first motor 200 through the output shaft 4, the second clutch plate 32, and the clutch housing 33, to drive the first motor 200 to generate electricity.

The power generation mode: The clutch housing 33 is connected to the first clutch plate 31 and disconnected from the second clutch plate 32. At this time, power of the engine 300 passes through the first clutch plate 31, and the clutch housing 33, to drive the first motor 200 to generate electricity.

The starting mode: The clutch housing 33 is connected to the first clutch plate 31 and is disconnected from the second clutch plate 32. At this time, power of the first motor 200 drives the engine 300 to rotate through the clutch housing 33 and the first clutch plate 31, to drive the engine 300 to start ignition.

By utilizing the first motor 200, the engine 300, the conversion device 10, the output shaft 4, and a connection relationship among the first motor 200, the engine 300, the conversion device 10, and the output shaft 4, the vehicle implements various modes when there is a shorter transmission chain. This greatly improves transmission efficiency and improves an economy of the vehicle while ensuring performance of the vehicle.

In some embodiments of the present disclosure, the clutch housing 33 is provided with a first opening 34 and a second opening 35, an output shaft of the engine 300 passes through the first opening 34 and is connected to the first clutch plate 31, and the output shaft 4 passes through the second opening 35 and is connected to the second clutch plate 32. The first clutch plate 31 is arranged/disposed corresponding to the first opening 34, and the second clutch plate 32 arranged/disposed corresponding to the second opening 35.

In some embodiments of the present disclosure, the first opening 34 and the second opening 35 are disposed in an axial direction of the clutch housing 33, the first opening 34 is provided on a first end face 331 of the clutch housing, and the second opening 35 is provided on a second end face 332 of the clutch housing.

In some embodiments of the present disclosure, the hybrid powertrain 1000 further includes a third gear 5, the third gear 5 and the clutch housing 33 are fastened, and the first motor output shaft 201 is connected to the third gear 5 through a fourth gear 6.

In some embodiments of the present disclosure, the clutch housing 33 is provided with a first opening 34 and a second opening 35, an engine output shaft 301 passes through the first opening 34 and is connected to the first clutch plate 31, and the output shaft 4 passes through the second opening 35 and is connected to the second clutch plate 32. It may be understood that the first clutch plate 31 is provided close to the first opening 34, and the second clutch plate 32 is provided close to the second opening 35. This structural configuration can shorten a length of the output shaft of the engine 300 and that of the output shaft 4 as much as possible, to reduce a weight of a system while avoiding a structure like a sleeve shaft. This reduces complexity of a system structure.

To implement the power transmission of the first motor 200, the hybrid powertrain 1000 further includes a third gear 5. The third gear 5 is fastened to the clutch housing 33. The first motor output shaft 201 can drive the clutch housing 33 to rotate by connecting the third gear 5 through the fourth gear 6. Different modes are implemented by connecting the housing and different clutch plates. This greatly enriches the vehicle driving modes or functions.

It may be understood that the first opening 34 and the second opening 35 are provided in an axial direction of the clutch housing 33, and the clutch housing 33 has two end faces in the axial direction. The first opening 34 is provided on the first end face 331, and the second opening 35 is provided on the second end face 332.

It may be understood that the conversion device 10 may be a dual clutch, and then openings are provided at both sides in an axial direction of the dual clutch, so that the engine and the output shaft 4 can be connected to the clutch plates through the openings. In this case, the third gear 5 and the clutch housing 33 can be fastened, for example, the third gear 5 is arranged/disposed at a middle position in the axial direction of the clutch housing 33, so that a force of the first motor 200 on the clutch housing 33 is more balanced and a force transmission process is more stable.

In some embodiments of the present disclosure, the conversion device 10 may include two single clutches, and openings of the two single clutches are provided opposite to each other so that housings of the single clutches can be fastened. In this way, there are openings on both sides in an axial direction of the conversion device 10, to facilitate the engine 300 and the output shaft 4 to be connected to the clutch plates. Therefore, a through hole may be formed in an axial direction of the third gear 5. The two single clutches on which the housings are fastened may penetrate the through hole and be fastened to the third gear 5.

In some embodiments of the present disclosure, the housings of the two single clutches are respectively fastened to both sides in the axial direction of the third gear 5, and axes of the two single clutches coincide with the axial direction of the third gear 5. It may be understood that, openings of the single clutches may face away from the third gear 5, to form the conversion device 10.

In some embodiments of the present disclosure, the first motor 200 and the engine 300 are arranged/disposed in the axial direction of the conversion device 10, and the first motor 200 and the engine 300 are arranged on both sides of the conversion device 10.

In some embodiments of the present disclosure, the first motor 200 and the engine 300 are respectively arranged on both sides in the axial direction of the conversion device 10. It may be understood that, since the engine 300 is large in volume and therefore occupies a large space, the space occupied by a drive system in the radial direction of the conversion device 10 can be reduced when the first motor 200 is arranged on a side of the conversion device 10 away from the engine 300, so that a structure of the drive system is more compact.

In some embodiments of the present disclosure, the engine 300 is arranged on a left side of a vehicle forward direction, and the first motor 200 is arranged on a right side of the vehicle forward direction. Because the engine output shaft 301 and the output shaft 4 of the hybrid powertrain 1000 of the present disclosure are arranged/disposed coaxially, when the engine 300 is arranged on the left side, and the engine 300 is in the normal operation, a rotational direction transmitted from the output shaft 4 to the wheels 9 can drive the vehicle.

In some embodiments of the present disclosure, the hybrid powertrain 1000 further includes an intermediate shaft 7, an input end of the intermediate shaft 7 is connected to the output shaft 4, and an output end of the intermediate shaft 7 is connected to the differential 8. At least two driving gears are arranged/disposed on the output shaft 4, at least two driven gears are sleeved on the intermediate shaft 7, the driving gears are correspondingly arranged with the driven gears, and the intermediate shaft 7 is selectively in transmission connection with one of the driven gears.

In some embodiments of the present disclosure, the hybrid powertrain 1000 further includes an intermediate shaft 7. At least two driven gears are arranged on the intermediate shaft 7. The driven gears can rotate relative to the intermediate shaft 7. At least two driving gears are correspondingly fastened to and arranged on the output shaft 4. The driving gears and the driven gears are meshed correspondingly. When the intermediate shaft 7 is selectively in transmission connection with one of the driven gears, the power of the output shaft 4 can be transmitted to the intermediate shaft 7, or the power of the intermediate shaft 7 can be transmitted to the output shaft 4. After the intermediate shaft 7 is added, the hybrid powertrain 1000 can select different gear outputs based on the requirements, to make a wider range of a speed change and enable the vehicle to implement better driving performance.

In some embodiments of the present disclosure, a first driving gear 41 and a second driving gear 42 are arranged on the output shaft 4, a first driven gear 71 and a second driven gear 72 are arranged on the intermediate shaft 7, the first driving gear 41 is correspondingly arranged with the first driven gear 71, and the second driving gear 42 is correspondingly arranged with the second driven gear 72. A synchronizer 73 is arranged/disposed on the intermediate shaft 7, the synchronizer 73 is fastened to the intermediate shaft 7 and is selectively in transmission connection with the first driven gear 71 or the second driven gear 72.

In some embodiments of the present disclosure, the first driving gear 41 and the second driving gear 42 are fastened to and arranged on the output shaft 4. The first driven gear 71 and the second driven gear 72 are sleeved on the intermediate shaft 7. The first driving gear 41 is meshed with the first driven gear 71. The second driving gear 42 is meshed with the second driven gear 72. The synchronizer 73 is arranged between the first driven gear 71 and the second driven gear 72. The synchronizer 73 is fastened to the intermediate shaft 7, and the synchronizer 73 can be selectively connected to the first driven gear 71 or the second driven gear 72, so that power output from the output shaft 4 is output to the synchronizer 73 through the first driven gear 71 or the second driven gear 72, and the synchronizer 73 drives the intermediate shaft 7 to rotate. The multi-gear design enhances power performance of the hybrid powertrain 1000, and can effectively improve driving experience of the vehicle.

In some embodiments of the present disclosure the intermediate shaft 7 is provided with an output gear 74. The output gear 74 is connected to the differential 8.

In some embodiments of the present disclosure, the intermediate shaft 7 is meshed with and connected to the differential 8 through the output gear 74, so that power of the intermediate shaft 7 is output to the wheels 9. It can be understood that, in the present disclosure, an input end of the intermediate shaft 7 may be the first driven gear 71 or the second driven gear 72, and an output end is the output gear 74.

In some embodiments of the present disclosure, the first motor 200 and the engine 300 are arranged in the axial direction of the conversion device 10, the first motor 200 and the engine 300 are respectively arranged on the both sides of the conversion device 10, the first driving gear 41, the second driving gear 42, the first driven gear 71, and the second driven gear 72 are all arranged on a side that is of the conversion device 10 and that is away from the engine 300.

In some embodiments of the present disclosure, the output shaft 4 of the first motor 200 and the output shaft 4 of the engine 300 are parallel to an axis of the conversion device 10. The first motor 200 and the engine 300 are arranged in the axial direction of the conversion device 10 and are respectively arranged on the sides in the axial direction of the conversion device 10. The first driving gear 41, the second driving gear 42, the first driven gear 71, and the second driven gear 72 are arranged on the side of the conversion device 10 away from the engine 300, and axes of the first driving gear 41, the second driving gear 42, the first driven gear 71, and the second driven gear 72 are parallel to the axis of the conversion device 10. It may be understood that the engine 300 occupies a large space, so that the engine 300 and the first motor 200 are respectively arranged on both sides. This can effectively reduce space occupation of the system in the radial direction of the conversion device 10 and improve a space utilization rate. The first motor 200 occupies a small space, so that the first driving gear 41, the second driving gear 42, the first driven gear 71, and the second driven gear 72 are arranged on a side of the conversion device 10 close to the first motor 200. This improves a space utilization rate, and reduces a volume of the entire system.

In some embodiments of the present disclosure, the engine 300 is provided on a right side of the conversion device 10 in the vehicle forward direction. Power of the output shaft 4 is transmitted to the wheels 9 through the intermediate shaft 7. Therefore, a rotation direction of the wheels 9 and a rotation direction of the output shaft 4 are the same, and the output shaft 4 is coaxial with the output shaft 4 of the engine 300, so that after the engine 300 is arranged on the right side, the vehicle can travel under normal rotation of the engine 300.

Another embodiment of the present disclosure proposes a vehicle 4000 that includes the hybrid powertrain 1000 described above.

In the vehicle 4000 according to this embodiment of the present disclosure, the hybrid powertrain 1000 thereof includes an engine, a first motor 200, a conversion device 10, and an output shaft 4. The engine 300 is connected to the first clutch plate 31 through the output shaft 4 of the engine 300, the first motor 200 is connected to a clutch housing 33 through an output shaft 4 of the first motor 200, and the output shaft 4 is connected to a second clutch plate 32. The first clutch plate 31 and the second clutch plate 32 may be selectively connected to the clutch housing 33, and the output shaft 4 may be connected to a differential 8, to output power of the engine 300 and the first motor 200 to wheels 9, to drive the vehicle to rotate, or to transmit power of the wheels 9 to the first motor 200 to drive the first motor 200 to generate electricity.

In some embodiments of the present disclosure, various operation modes may be implemented by controlling the clutch housing 33 to be connected to or disconnected from the first clutch plate 31 and the second clutch plate 32, for example, a hybrid drive mode, an engine 300 direct drive mode, an electric drive mode, a braking energy feedback mode, a power generation mode, and a starting mode, and the conditions of those modes are described above and are not repeated herein. By utilizing the first motor 200, the engine 300, the conversion device 10, the output shaft 4, and a connection relationship among the first motor 200, the engine 300, the conversion device 10, and the output shaft 4, the vehicle implements various modes when there is a shorter transmission chain. This greatly improves transmission efficiency and improves an economy of the vehicle while ensuring performance of the vehicle.

A hybrid four-wheel drive system according to an embodiment of the present disclosure includes the hybrid powertrain 1000 of the foregoing embodiment.

The vehicle 4000 according to this embodiment of the present disclosure includes the hybrid powertrain 1000 of the foregoing embodiment. The hybrid powertrain 1000 works through the cooperation of the conversion device 10, the first motor 200, and the engine 300. The first motor 200 and the engine 300 selectively output the power to the driving end through the same conversion device 10, and the hybrid powertrain 1000 does not need to be provided with a reversing gear. This can simplify a structure of the hybrid powertrain 1000, so that the structure of the hybrid powertrain 1000 is compact. In addition, the first motor 200 and/or the engine 300 is switched to selectively output the power to the driving end through the same conversion device 10, and the engine 300 selectively outputs the power to the first motor 200 through the conversion device 10, so that the vehicle 4000 can be switched to different driving modes. This can improve driving performance of the vehicle 4000.

In the descriptions of this specification, descriptions using reference terms "an embodiment", "some embodiments", "an exemplary embodiment", "an example", "a specific example", or "some examples" mean that characteristics, structures, materials, or features described with reference to the embodiment or example are included in at least one embodiment or example of the present disclosure. In this specification, examples of descriptions of the foregoing terms do not necessarily refer to the same embodiment or example. In addition, the described features, structures, materials, or characteristics may be combined in a proper manner in any one or more of the embodiments or examples.

Although embodiments of the present disclosure have been shown and described, a person of ordinary skill in the art should understand that, various changes, modifications, replacements, and variations may be made to the embodiments without departing from the principles and spirit of the present disclosure, and the scope of the present disclosure is as defined by the appended claims and their equivalents.

What is claimed is:

1. A hybrid powertrain, comprising:
   a conversion device, a first motor, an engine, and a support shaft;
   at least one of the first motor and the engine being configured to output power to a driving end through the conversion device; and
   the engine being configured to output power to the first motor through the conversion device, to drive the first motor to generate electricity,
   wherein:
   the conversion device comprises a first clutch assembly, a second clutch assembly, and a transmission piece;
   the first clutch assembly comprises a first engagement portion and a second engagement portion, the first engagement portion is fastened to the transmission piece, the second engagement portion is configured to be engaged with the first engagement portion, and the second engagement portion is connected to an engine output shaft;
   the second clutch assembly comprises a third engagement portion and a fourth engagement portion, the third engagement portion is fastened to the transmission piece, the fourth engagement portion is configured to be engaged with the third engagement portion, and the fourth engagement portion is connected to a front differential of front axle wheels; and
   the transmission piece is connected to the support shaft and disposed coaxially with the support shaft, the second engagement portion and the fourth engagement portion are rotatably sleeved on the support shaft, the second engagement portion comprises a chamber, and a first end of the support shaft is located in the chamber and rotatably connected to the second engagement portion.

2. The hybrid powertrain according to claim 1, wherein the conversion device comprises:
   the first motor is configured to output power to the transmission piece;

the first clutch assembly is connected between the engine output shaft and the transmission piece to enable the engine to selectively output power to the first motor; and the second clutch assembly is connected between the transmission piece and the front differential of front axle wheels, to selectively connect the transmission piece and front wheels.

3. The hybrid powertrain according to claim 1, wherein the first engagement portion is located on a side of the transmission piece close to the engine, and the third engagement portion is located on a side of the transmission piece away from the engine.

4. The hybrid powertrain according to claim 3, wherein the transmission piece comprises a gear, the first motor comprises a first motor gear disposed on a first motor output shaft, the first motor gear and the transmission piece form a gear pair, and the first motor and the engine are connected by the gear pair.

5. The hybrid powertrain according to claim 3, wherein the first engagement portion is connected to the third engagement portion to form a clutch body, and the transmission piece is disposed on the clutch body; and the first engagement portion and the third engagement portion are integrally formed.

6. The hybrid powertrain according to claim 1, wherein the chamber comprises a first limiting portion, a second limiting portion is disposed at the first end of the support shaft, and the first limiting portion and the second limiting portion limit axial movement of the support shaft; and the first limiting portion is a spherical groove, the second limiting portion is a spherical protrusion, a center of the spherical protrusion is aligned with a center of the spherical groove, and an inner wall of the spherical groove is spaced apart from the spherical protrusion.

7. The hybrid powertrain according to claim 1, further comprising a first bearing, the second engagement portion being rotatably connected to the support shaft through the first bearing.

8. The hybrid powertrain according to claim 1, further comprising a housing, the second engagement portion being rotatably connected to the housing; and the second engagement portion and the housing being connected at a first connecting position, the second engagement portion and the support shaft being connected at a second connecting position, and in a radial direction of the support shaft, an orthographic projection of the first connecting position at least partially overlapping with an orthographic projection of the second connecting position.

9. The hybrid powertrain according to claim 8, further comprising a first bearing and a second bearing, the first bearing being disposed between the second engagement portion and the support shaft, the second bearing being sleeved on the second engagement portion, and in the radial direction of the support shaft, an orthographic projection of the second bearing at least partially overlapping an orthographic projection of the first bearing.

10. The hybrid powertrain according to claim 1, further comprising a third bearing, the fourth engagement portion being rotatably connected to the support shaft through the third bearing.

11. The hybrid powertrain according to claim 1, further comprising:

a housing, a second end of the support shaft being rotatably connected to the housing; and a fourth bearing, the second end of the support shaft being rotatably connected to the housing through the fourth bearing.

12. The hybrid powertrain according to claim 1, further comprising:

a second motor, and a transmission, the transmission being connected between the second motor and a rear differential of rear wheels, the second motor outputting power to the rear wheels through the transmission, and the driving end being front wheels.

13. The hybrid powertrain according to claim 1, further comprising: an output shaft, wherein the conversion device comprises a first clutch plate, a second clutch plate, and a clutch housing, the engine is in transmission connection with the first clutch plate through an engine output shaft, the first motor is in transmission connection with the clutch housing through a first motor output shaft, and the output shaft is in transmission connection with the second clutch plate; and the clutch housing is engaged with the first clutch plate to enable the hybrid powertrain to be in a power generation mode or a starting mode; or the clutch housing is engaged with the second clutch plate to enable the hybrid powertrain to be in a electric drive mode or a braking feedback mode; or the clutch housing is engaged with the first clutch plate and the second clutch plate to enable the hybrid powertrain to be in one of a hybrid drive mode, a drive-while-generating mode, or an engine direct drive mode.

14. The hybrid powertrain according to claim 13, wherein the clutch housing comprises a first opening and a second opening, the engine output shaft passes through the first opening and is connected to the first clutch plate, and the output shaft passes through the second opening and is connected to the second clutch plate; and the first opening and the second opening are disposed in an axial direction of the clutch housing, the first opening is disposed on a first end face of the clutch housing, and the second opening is disposed on a second end face of the clutch housing.

15. The hybrid powertrain according to claim 13, further comprising a third gear, the third gear being fastened with the clutch housing, and the first motor output shaft being connected to the third gear through a fourth gear.

16. The hybrid powertrain according to claim 13, wherein the first motor and the engine are disposed in an axial direction of the conversion device, and the conversion device is disposed between the first motor and the engine.

17. The hybrid powertrain according to claim 13, further comprising an intermediate shaft, an input end of the intermediate shaft being connected to the output shaft, and an output end of the intermediate shaft being connected to a differential;

a first driving gear and a second driving gear being disposed on the output shaft, a first driven gear and a second driven gear being disposed on the intermediate shaft, the first driving gear corresponding to the first driven gear, and the second driving gear corresponding to the second driven gear;

a synchronizer being fastened to the intermediate shaft and being in transmission connection with the first driven gear or the second driven gear; and the first motor and the engine being disposed in an axial direction of the conversion device, the conversion device being disposed between the first motor and the engine, and the first driving gear, the second driving gear, the first driven gear, and the second driven gear being disposed on a side of the conversion device away from the engine.

18. A vehicle, comprising a hybrid powertrain, comprising:

a conversion device, a first motor, an engine, and a support shaft;

at least one of the first motor and the engine being configured to output power to a driving end through the conversion device; and the engine being configured to output power to the first motor through the conversion device, to drive the first motor to generate electricity, wherein:

the conversion device comprises a first clutch assembly, a second clutch assembly, and a transmission piece;

the first clutch assembly comprises a first engagement portion and a second engagement portion, the first engagement portion is fastened to the transmission piece, the second engagement portion is configured to be engaged with the first engagement portion, and the second engagement portion is connected to an engine output shaft;

the second clutch assembly comprises a third engagement portion and a fourth engagement portion, the third engagement portion is fastened to the transmission piece, the fourth engagement portion is configured to be engaged with the third engagement portion, and the fourth engagement portion is connected to a front differential of front axle wheels; and the transmission piece is connected to the support shaft and disposed coaxially with the support shaft, the second engagement portion and the fourth engagement portion are rotatably sleeved on the support shaft, the second engagement portion comprises a chamber, and a first end of the support shaft is located in the chamber and rotatably connected to the second engagement portion.

* * * * *